(12) United States Patent
Fuerlinger et al.

(10) Patent No.: US 9,024,235 B2
(45) Date of Patent: May 5, 2015

(54) SYSTEM FOR SECURING A WIRE CORE IN A COUPLING AND WIRE INLET NOZZLE FOR SUCH A SECURING SYSTEM

(75) Inventors: Johannes Fuerlinger, Sipbachzell (AT); Walter Mitterhumer, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 382 days.

(21) Appl. No.: 13/643,681

(22) PCT Filed: May 11, 2011

(86) PCT No.: PCT/AT2011/000224
§ 371 (c)(1),
(2), (4) Date: Oct. 26, 2012

(87) PCT Pub. No.: WO2011/153560
PCT Pub. Date: Dec. 15, 2011

(65) Prior Publication Data
US 2013/0048699 A1 Feb. 28, 2013

(30) Foreign Application Priority Data
Jun. 11, 2010 (AT) ...................... 958/2010

(51) Int. Cl.
*B23K 9/12* (2006.01)
*B23K 9/32* (2006.01)
*B23K 9/29* (2006.01)

(52) U.S. Cl.
CPC ................. *B23K 9/122* (2013.01); *B23K 9/295* (2013.01); *B23K 9/32* (2013.01)

(58) Field of Classification Search
CPC ........ B23K 9/123; B23K 9/122; B23K 9/295; B23K 9/32; B23K 9/325
See application file for complete search history.

(56) References Cited

U.S. PATENT DOCUMENTS

| | | | |
|---|---|---|---|
| 7,663,074 B2* | 2/2010 | Wells | 219/137.31 |
| 2005/0072764 A1* | 4/2005 | Lajoie | 219/76.14 |
| 2007/0062922 A1* | 3/2007 | Zamuner | 219/137.31 |
| 2008/0032542 A1* | 2/2008 | Bankstahl | 439/363 |
| 2008/0217314 A1 | 9/2008 | Wells et al. | |

(Continued)

FOREIGN PATENT DOCUMENTS

| | | |
|---|---|---|
| CA | 2 721 181 | 10/2009 |
| DE | 71 46 805 | 3/1972 |
| DE | 10 2008 019327 | 10/2009 |

(Continued)

OTHER PUBLICATIONS

International Search Report of PCT/AT2011/000224, date of mailing Aug. 29, 2011.

(Continued)

*Primary Examiner* — Geoffrey S Evans
(74) *Attorney, Agent, or Firm* — Collard & Roe, P.C.

(57) ABSTRACT

A system for mounting a wire core for a welding wire in a coupling of a hose assembly, wherein the wire core is fixed with a wire inlet nozzle in the coupling and the wire inlet nozzle is connected to the coupling by way of a mounting element which is formed in a cylindrical manner and has at least one slot to form at least two movable jaws and a wire inlet nozzle for such a mounting system are disclosed. At the end opposite from a wire inlet element, the mounting element is provided with an oval flange, which oval flange is formed in a raised manner with respect to the cylindrical region.

8 Claims, 5 Drawing Sheets

(56) References Cited

U.S. PATENT DOCUMENTS

2010/0038345 A1* 2/2010 Nishimura ...................... 219/74
2010/0206852 A1* 8/2010 Ohkubo et al. ............... 219/108

FOREIGN PATENT DOCUMENTS

| KR | 2002 0042604 | 6/2002 |
| WO | WO 2005/021199 | 3/2005 |
| WO | WO 2005/097391 | 10/2005 |

OTHER PUBLICATIONS

Austrian Office Action of A 958/2010 dated Dec. 14, 2010 with English translation of relevant parts.

* cited by examiner

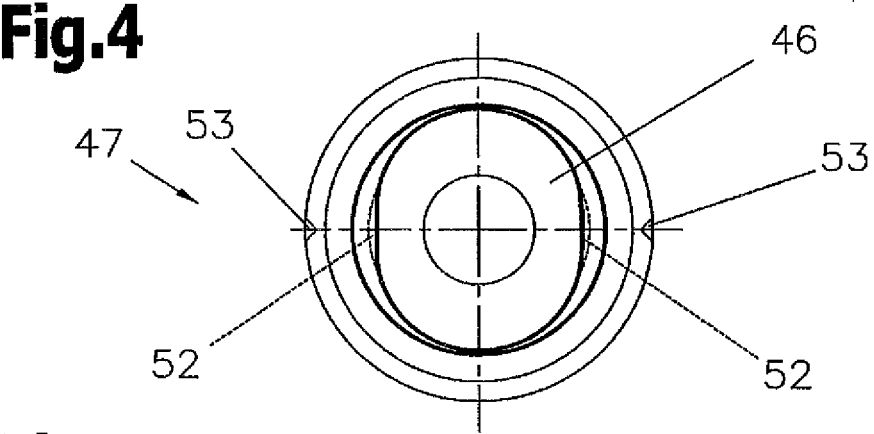
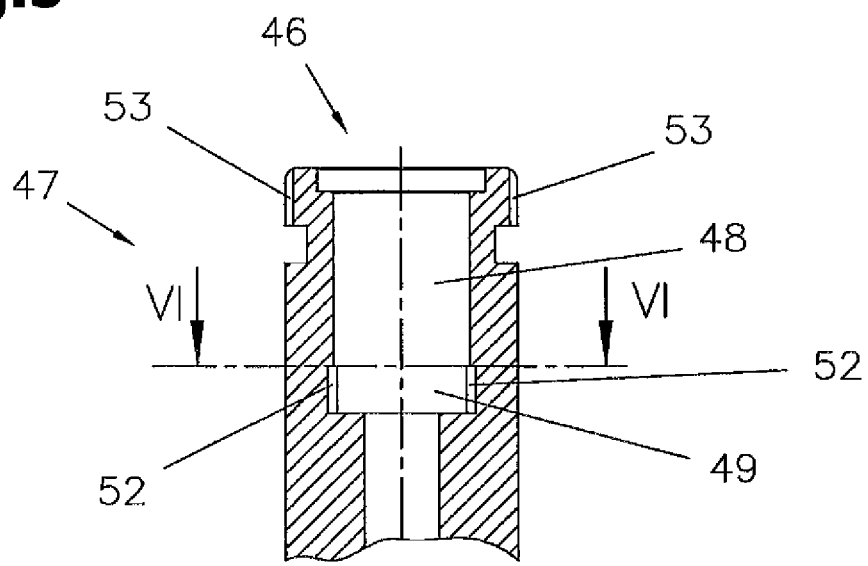
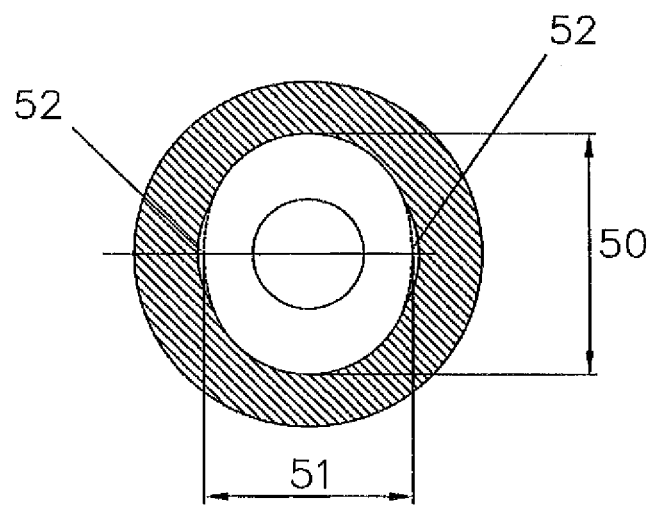

SYSTEM FOR SECURING A WIRE CORE IN A COUPLING AND WIRE INLET NOZZLE FOR SUCH A SECURING SYSTEM

CROSS REFERENCE TO RELATED APPLICATIONS

This application is the National Stage of PCT/AT2011/000224 filed on May 11, 2011, which claims priority under 35 U.S.C. §119 of Austrian Application No. A 958/2010 filed on Jun. 11, 2010, the disclosure of which is incorporated by reference. The international application under PCT article 21(2) was not published in English.

The invention relates to a system for mounting a wire core for a welding wire in a coupling of a hose assembly, the wire core being fixed with a wire inlet nozzle in the coupling and the wire inlet nozzle being connected to the coupling by way of a mounting means which is formed in a cylindrical manner and has at least one slot to form at least two movable jaws, wherein the mounting means of the wire inlet nozzle has an opening to removably receive the wire core, and by a manual rotational movement of the wire inlet nozzle positioned in the coupling the wire core can be fixed in the mounting means and simultaneously the wire core inlet nozzle can be fixed in the coupling.

The invention also relates to a wire inlet nozzle for a mounting system mentioned above having a wire inlet element and a mounting means which is formed in a cylindrical manner and has at least one slot to form at least two movable jaws, wherein the mounting means has an opening to removably receive a wire core, and is designed deformable to simultaneously fix the wire core in the mounting means and the wire inlet nozzle in the coupling by a manual rotational movement.

A wire inlet nozzle of the present type has been known from DE 71 46 805 U, wherein the mounting is performed using a sleeve nut.

Other designs are for example known from WO2005/097391 A2, WO2005/021199 A1 or DE 102008019327 A1.

The object of the invention is to provide a mounting system mentioned above and a wire inlet nozzle for such a mounting system, by which a simple mounting of wire inlet nozzle and wire core performed without tools can be combined into one working step.

The object of the invention is solved by a mounting system mentioned above, wherein the mounting means at the end opposite from a wire inlet element is provided with an oval flange, which oval flange is formed in a raised manner with respect to the cylindrical region. Said design enables a simple clamping of the wire core and a quick, simultaneous mounting of wire core and wire inlet nozzle without tools. No additional elements need to be mounted to the wire core so that so-called "endless wire cores" can be used in a simple manner, which are cut to desired length. The wire core can be mounted from any side, thus, pushed through the hose assembly from any side, since no additional elements are mounted to the wire core. Another advantage is that the wire core is not distorted upon fixation. The present mounting system is also independent from material (steel, synthetic material, etc.) of the wire core. The clamping of wire core is done by distorting the wire inlet nozzle with little effort, since application of force is done separately from clamping.

Along a first section the coupling has an oval recess corresponding to the oval flange and at the end a second section which is formed virtually round. Thereby the positioning of the flange of the wire inlet nozzle in the coupling and a possible distortion of the wire inlet nozzle with respect to the coupling is pre-defined. Also, an autonomous removal of the wire inlet nozzle from the coupling is prevented by this design.

In the wire inlet nozzle a region between wire inlet element and mounting means is preferably designed in a finned or corrugated manner to facilitate a manual rotational movement performed without tools to fix the wire inlet nozzle.

In order to carry out a visual control of fixation and clamping of the wire core, a notch is arranged in each of the fixing element of the wire inlet nozzle and the coupling to mark the fixation of wire core. With of a proper fixation both notches are preferably in the same position and are aligned with one another, respectively.

The object of the invention is also solved by an above wire inlet nozzle for an above mounting system, wherein the mounting means at the end opposite from a wire inlet element is provided with an oval flange, which oval flange is formed in a raised manner with respect to the cylindrical region. The advantages and optional features, which can thereby be achieved, are referred to in the above description of the mounting system.

The present invention is explained in more detail with the help of the attached schematic drawings. In which:

FIG. 4 is a schematic top view of a current-carrying bolt of a coupling;

FIG. 5 is a schematic sectional view of said current-carrying bolt according to FIG. 4;

FIG. 6 is a schematic sectional view of the current-carrying bolt according to FIG. 5 taken along intersecting line VI-VI;

Introductorily, it is noted that same parts of the embodiment are depicted with same reference numbers. The disclosure contained in the entire description can be transferred to same parts having same reference numbers by analogy. Further, also individual features from the embodiments illustrated can present independent solutions according to the invention.

Figure 1:
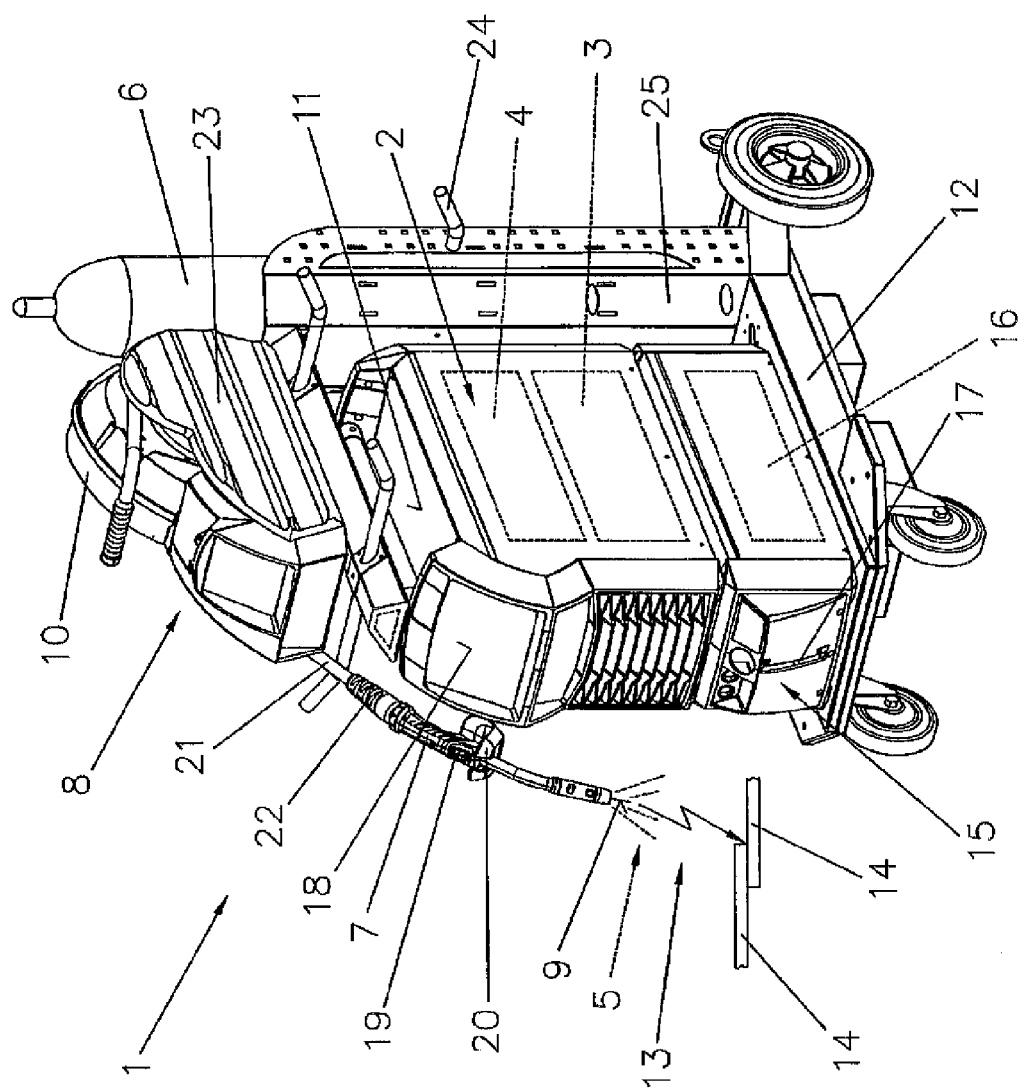
FIG. 1 is a schematic illustration of a welding device.
Figure 2:
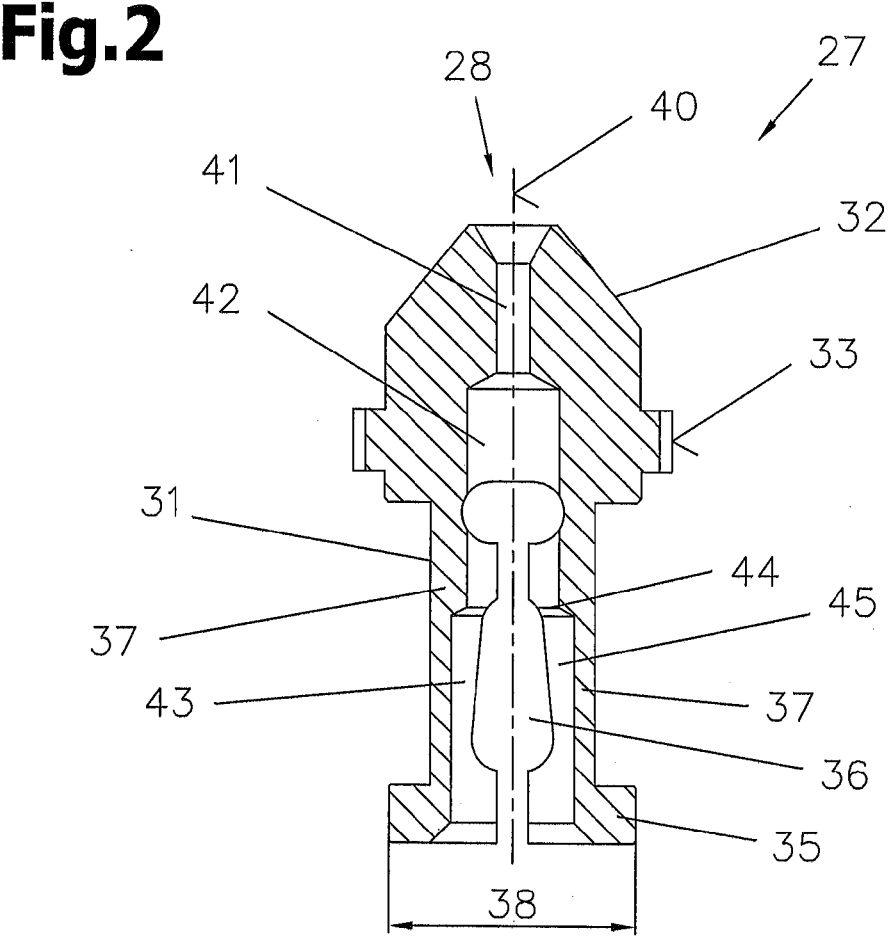
FIG. 2 is a schematic sectional view of the wire inlet nozzle according to the present invention.
Figure 3:
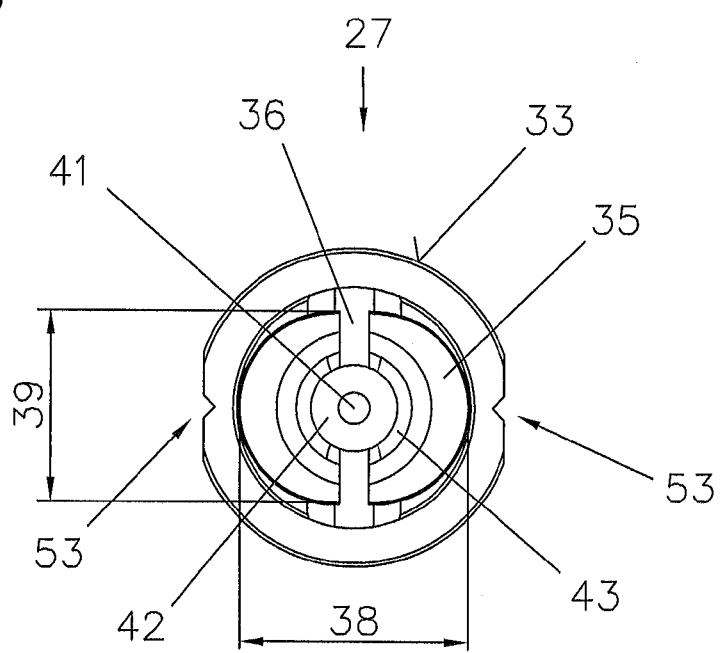
FIG. 3 is a schematic top view of the wire inlet nozzle.
Figure 7:
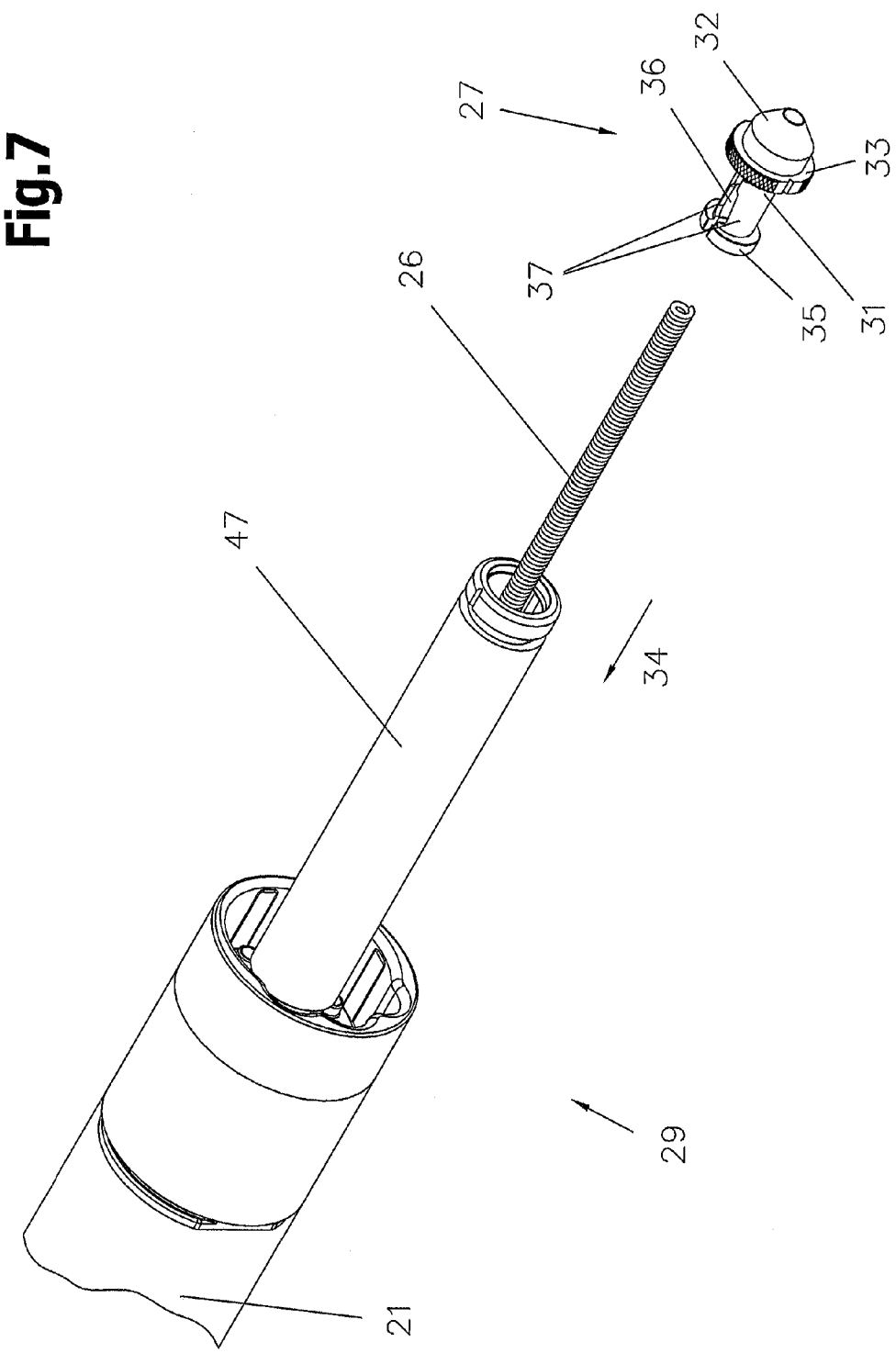
FIG. 7 is a schematic exploded view of the mounting system according to the invention.
Figure 8:
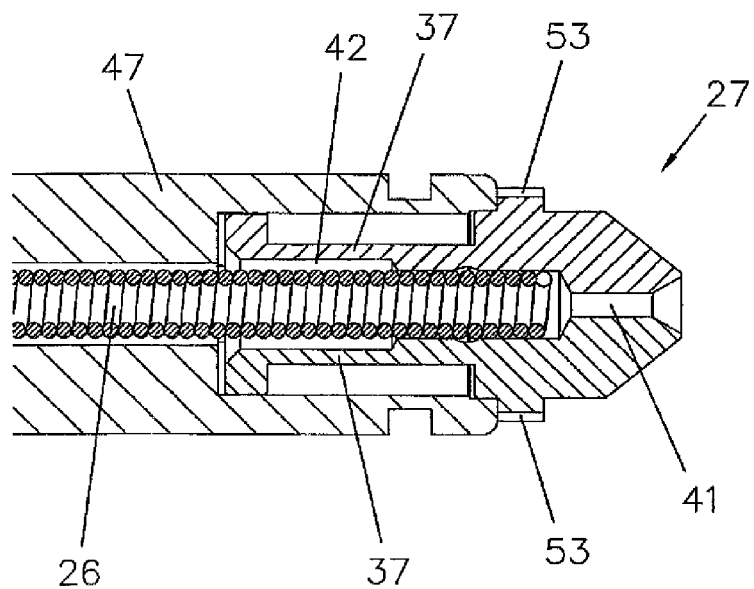
FIG. 8 is a schematic sectional view of the mounting system in mounted state.
Figure 9:
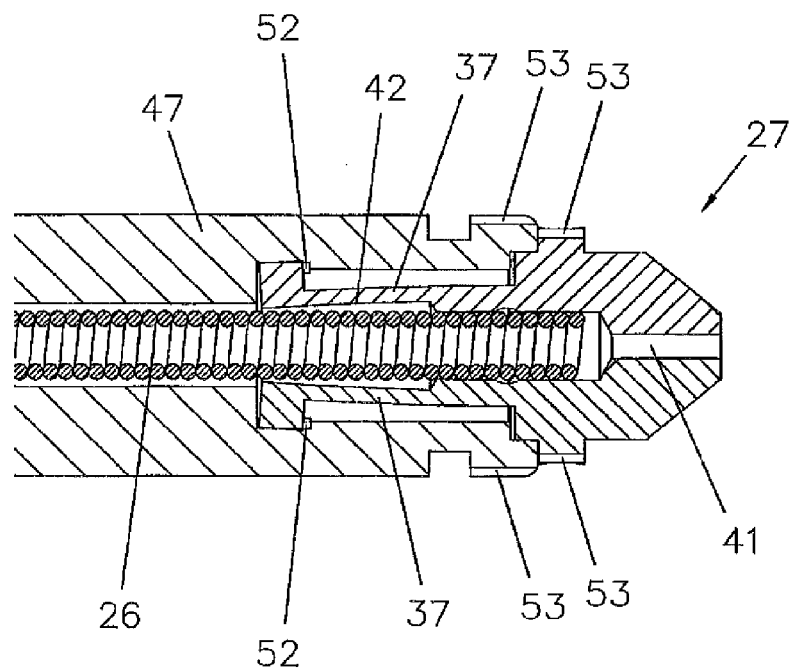
FIG. 9 is a schematic sectional view of the mounting system in mounted, distorted and fixed state.

In FIG. 1 a welding device 1 or a welding system for various processes or methods, such as MIG/MAG welding or WIG/TIG welding, electrode welding, twin wire/tandem welding, plasma or soldering processes, etc. is shown.

Welding device 1 comprises a power source 2 having a power element 3, a control device 4 and further components and cables not shown, such as a switchover element, control valves, etc. arranged therein. For example, control device 4 is connected to a control valve, which is arranged in a supply line for a gas 5, especially a protective gas, such as $CO_2$, helium or argon and the like, between a gas tank 6 and a welding torch 7 or a blowpipe.

Furthermore, a wire feed unit 8, as usual in MIG/MAG welding, can also be actuated via control device 4, wherein a filler material or a welding wire 9 is supplied from a feed drum 10 or a wire reel into the section of welding torch 7. Of course it is possible to have the wire feed unit 8, known from prior art, incorporated within welding device 1, particularly within housing 11 of power source 2, and not positioned as an additional device on a carriage 12 as shown in FIG. 1. The wire feed unit 8 can also be mounted directly on welding device 2, wherein the housing 11 of power source 2 is formed on the surface thereof to receive the wire feed unit 8, so that carriage 12 can be omitted.

The welding wire 9 or filler material can also be supplied to the working position by the wire feed unit 8 outside the welding torch 7, wherein within the welding torch 7 preferably a non-consumable electrode is arranged as usual in WIG/TIG welding.

The power for creating an electric arc 13, particularly a working arc, between the electrode or the welding wire 9 and one work piece 14 preferably formed of one or more parts is supplied via a welding cable (not shown) from the power element 3 of power source 2 to welding torch 7, particularly the electrode or welding wire 9. The work piece 14 to be welded is connected with power source 2 via a further welding cable (not shown) for further potential, particularly a ground cable, whereby an electric circuit can be created for a process via arc 13 or the plasma jet formed. Using a torch having an internal electric arc 13 ((not shown) like with plasma torches) both welding cables are supplied to the torch, so that a respective electric circuit (not shown) can be created within the torch.

In order to cool welding torch 7 it is connected via a cooling device 15 by interconnection of potential components, such as a flow controller, to a liquid reservoir, particularly a water reservoir 16 with level meter 17. During initial operation of welding torch 7 the cooling device 15, particularly a liquid pump used for the liquid arranged in the water reservoir 16, is started, whereby a cooling of welding torch 7 is effected. As seen in the embodiment shown, the cooling device 15 is positioned on the carriage 12, followed by power source 2. The individual components of the welding system, i.e. power source 2, wire feed unit 8 and cooling device 15, are formed such that they have respective projections or recesses, so that they can be stapled or put on top of each other.

Further, welding device 1, particularly power source 2, has an input and/or output unit 18, by means of which unit various welding parameters, operation modi or welding programs of welding device 1 can be adjusted or selected and displayed. Welding parameters, operation modi or welding programs adjusted with the help of that input and/or output unit 18 are forwarded to control device 4, and the individual components of the welding device 1 are then actuated, or respective values for regulating or controlling are provided from this unit. Using an adequate welding torch 7 even adjustment procedures can be done via welding torch 7, the welding torch 7 is thereto equipped with a welding torch input and/or output unit 19. Preferably, welding torch 7 is connected to the welding device 1, particularly power source 2 or wire feed unit 8 via a data bus, particularly a serial data bus. In order to start the welding process the welding torch 7 has in most cases a start switch (not shown), so that by pressing said start switch the electric arc 13 can be ignited. In order to be protected from the heat coming from electric arc 13 the welding torch 7 can be equipped with a protective heat shield 20.

In the embodiment shown the welding torch 7 is connected to welding device 1 via a hose package 21, wherein the hose package 21 can be fastened on welding torch 7 via a bend protection 22. In the hose package 21 the individual cables, such as supply cable, cables for welding wire 9, for gas 5, for cooling circuit, for data transfer, etc. are arranged from welding device 1 to welding torch 7, whereas the ground cable is preferably connected to power source 2 separately. Preferably, the hose package 21 is connected to power source 2 or wire feed unit 8 via a coupling device, not shown, whereas the individual cables within hose package 21 are fastened with a bend protection on or in welding torch 7. In order to ensure an adequate stress relief of hose package 21 the hose package 21 can be connected to housing 11 of power source 2 or wire feed unit 8 via a stress relief unit (not shown).

Basically, in different welding methods or welding devices 1, such as WIG devices or MIG/MAG devices or plasma devices, not all components previously mentioned need to be used or employed. The welding torch 7 can also be designed as an air-cooled welding torch 7 and the cooling device 15 can be omitted. The welding device 1 is at least formed by power source 2, wire feed unit 8 and cooling device 15, if need be, wherein these components can also be arranged in a common housing 11. Still further parts or components, as for example a rub protection 23 on wire feed unit 8 or an optional support 24 on a holding device 25 for the gas storage 6, etc. can be arranged.

In addition it is known that welding wire 9 is supplied to welding torch 7 in a wire core 26 or welding wire core 26 within the hose assembly 21. The transfer of welding wire 9 from the feed unit of wire feed unit 8 into the wire core 26 happens via a so-called wire inlet nozzle 27, which substantially has a continuous opening 28 for the welding wire 9 in the center. The wire inlet nozzle 27 is preferably screwed into a coupling 29 of the hose assembly 21, whereby wire core 26 is simultaneously fixed. However, this fixation requires to preliminary fix a mounting means on the wire core 26, for example by pressing. This mounting means correspondingly increases the diameter of the wire core 26, so that it cannot slip any more and is fixed.

According to the invention a mounting without mounting means is now provided for, so that a mounting of wire core 26 without tools is possible, wherein wire core 26 is put into the wire inlet nozzle 27 and simultaneous to mounting of wire inlet nozzle 27 also wire core 26 is clamped and fixed into wire inlet nozzle 27.

This is described in more detail below with the help of FIGS. 2 to 9.

For the simultaneous mounting of wire core 26 and wire inlet nozzle 27 the wire inlet nozzle 27 is specifically formed as a part of the mounting system. Particularly, a portion of wire inlet nozzle 27 is formed as a mounting means 31, the portion of the wire inlet element 32 and the portion of stop 33 being adapted to it. Both wire core element 32 and stop 33 are basically known. Seen in transporting direction 34 or major transporting direction of welding wire 9, wire inlet element 32 presents the first portion, stop 33 the second portion and mounting means 31 the third portion.

Mounting means 31 is formed in a cylindrical manner, wherein on the end opposite the wire inlet element 32 an oval (or elliptical) flange 35 is arranged. In addition the mounting means 31 is divided into at least two parts by at least one slot 36. In case of one slot 36 two jaws 37 are resulting, which provide the mounting element 31 with a corresponding deformability. Slot 36 also extends across the oval flange 35, which is as well divided into two halfs. Mounting means 31 is virtually cut through the middle so that the two movable jaws 37 will result.

The length of major axis 38 of oval flange 35 is larger than the diameter of that part of mounting means 31 that is formed in a cylindrical manner. However, a length of a minor axis 39 being larger than the diameter of the cylindrical part is also preferred. Accordingly, the oval flange 35 thus projects the cylindrical part of the mounting means 31. The length of the major axis 38 of oval flange 35 is smaller than the diameter of stop 33 of wire inlet nozzle 27. Thereby mounting means 31 can be received by coupling 29 of hose assembly 21 till stop 33. Mounting means 31 is not visible in mounted state, since it is thus arranged within coupling 29.

Three concentric holes are arranged around the middle axis 40 of wire inlet nozzle 27, the first hole 41 being arranged in wire inlet element 32 and adapted to the diameter of welding wire 9, the second hole 42 being adapted to diameter of wire core 26 and the third hole 43 being larger than the diameter of wire core 26. The third hole 43 is arranged in the region of mounting means 31 and the second hole 42 is arranged in the region of stop 33. A press region 44 for wire core 26 is realized by the second hole 42. The region of the mounting means 31 around the third hole 43 is formed as a spring region 45. The press region 44 is substantially formed in the transition region between third hole 43 and second hole 42, thus at the end of spring region 45. Thus, both press region 44 and spring region 45 are arranged in the mounting means 31. Slot 36 is formed in an enlarged manner prior and after press region 44 so that a defined press region 44 is formed. Thus, wire core 26 is clamped and fixed into this press region 44 by narrowing the press region 44. The force for clamping wire core 26 in press region 44 is determined according to lever principle with the help of the length of spring area 45. Since the oval flange 35 is arranged at the beginning of spring area 45 and formed projecting with respect to the cylindrical region, the jaws 37 are correspondingly pressed together over said oval flange 35. Clamping of wire core 26 into press region 44 can thus be carried out at the beginning of spring region 45 with little effort. Additionally, the force can also be manipulated by the design of slots 36—such as enlargement prior and after press region 44—as thereby the amount of material to be moved can be manipulated.

In order to mount wire core 26, it is carried through third hole 43 of wire inlet nozzle 27 and put into second hole 42. Afterwards mounting means 31 with wire core 26 included therein can be inserted into a recess 46 of coupling 29 of hose assembly 21 as a further part of the mounting system. Thus, wire core 26 is located in press region 44 of wire inlet nozzle 27, wherein it is not yet narrowed and accordingly wire core 26 is not yet clamped. For example, recess 46 can on the face and in the center be arranged on a current-carrying bolt 47 of coupling 29 so that wire core 26 can be positioned in the center of current-carrying bolt 47. Recess 46 is in a first section 48 according to oval flange 35 designed in a corresponding oval manner. Accordingly, the first section 48 of recess 46 also has a major axis and a minor axis which substantially correspond to major axis 38 and minor axis 39 of oval flange 35. Thereby the position for inserting the mounting means 31 till stop 33 can be defined. The first section 48 of recess 46 has a length or depth which substantially corresponds to the cylindrical section of mounting means 31 or the length between stop 33 and oval flange 35. Adjacent to oval section 48 recess 46 in the second section 49 is designed virtually round corresponding to the height of oval flange 35. Accordingly, wire inlet nozzle 27 can be distorted as soon as stop 33 abuts on current-carrying bolt 47. Preferably, the front face of stop 33 is designed in a finned or corrugated manner so that the user or welder can distort the welding inlet nozzle 27 without tools only using his fingers and can thereby fix wire core 26 and wire inlet nozzle 27. Stop 33 is also formed as fixing element of wire inlet nozzle 27.

A distortion of wire inlet nozzle 27 is thus only possible when the oval flange 35 is located below the oval section 48 of recess 46. In order to press the jaws 37 together on distortion, the second section 49 is correspondingly formed oval or elliptical, wherein there is merely a minimum difference between the length of major axis 50 and the length of minor axis 51. Thus, the second section 49 is formed virtually round. The length of the major axis of the first section 48 equals the length of the major axis 50. When wire inlet nozzle 27 is distorted, the major axis 38 of oval flange 35 is twisted to the minor axis 51 in the second section 49 of recess 46 and jaws 37 are pressed together around the length difference between the major axis 50 and the minor axis 51, whereby press region 44 is correspondingly narrowed and wire core 26 is clamped.

Fixation of wire inlet nozzle 27 is performed in that the oval flange 35 formed in a raised manner with respect to the cylindrical region of mounting means 31 in the region of the major axis 50 is at least partially distorted behind the oval section 48 of recess 46, i.e. aligned with minor axis 51 of oval section 48 of recess 46. This is due to the fact that the second section 49 of recess 46 is formed virtually round. Accordingly, the length aligned with minor axis 51 of oval section 48 of recess 46 is larger than the length of minor axis 51. Thus, oval flange 35 can be distorted behind the oval section 48 of recess 46 and wire inlet nozzle 27 can not be pulled out of current-carrying bolt 47.

Aligned with minor axis 51 of oval section of recess 46 the virtually round second section 49 of recess 46 is provided with bulges 52 so that clamping of wire core 26 is slightly loosened and jaws 37 slightly diverge again. Thereby a catching can be noticed by the user and additionally a protection of fixation of wire inlet nozzle 27 is achieved, since prior to a distortion of wire inlet nozzle 27 jaws 37 need to be pressed together slightly, i.e. a certain effort is required. Thus, an unintentional distortion is substantially excluded.

Preferably, the pressed together state or fixed wire core 26 can be characterized by at least two opposite notches 53 in the front face of stop 33 and in current-carrying bolt 47. When the notches 53 of stop 33 and current-carrying bolt 47 align, wire core 26 is fixed. The notches 53 aligned are used for marking a proper fixation for the user. The notches 53 are also located on the front face along the major axis 38 of oval flange 35 of wire inlet nozzle 27 and on the minor axis 51 of second section 49 of recess 46 of current-carrying bolt 47 (see FIGS. 3 and 4). Thus, the notches 53 on the wire inlet nozzle 27 are arranged normally to slot 36 and the notches 53 on current-carrying bolt 47 are arranged in alignment with slot 36 as long as wire inlet nozzle 27 has not been distorted.

Since the second section 49 of recess 46 of current-carrying bolt 47 is formed virtually round, wire core 26 can be fixed by distortion in any direction. Basically, wire core 26 is fixed or loosened by a quarter-turn of wire inlet nozzle 27. Mounting means 31 can have fins, a thread or the like in the opening to receive wire core 26, through which the clamping of wire core 26 can be improved. Such a modification will preferably be made with softer materials of wire core 26.

The invention claimed is:

1. A system for mounting a wire core for a welding wire in a coupling of a hose assembly, the wire core being fixed with a wire inlet nozzle in the coupling and the wire inlet nozzle being connected to the coupling by a mounting element which is formed in a cylindrical manner and has at least one slot to form at least two movable jaws, wherein the mounting element of the wire inlet nozzle has an opening to removably receive the wire core, and by a manual rotational movement of the wire inlet nozzle positioned in the coupling, the wire core can be fixed in the mounting element and simultaneously the wire inlet nozzle can be fixed in the coupling, wherein the mounting element is provided at an end opposite from a wire inlet element with an oval flange, which oval flange is formed in a raised manner with respect to a cylindrical region.

2. A mounting system according to claim 1, wherein the coupling has along a first section an oval recess and at an end of the coupling a second section formed virtually round.

3. A mounting system according to claim 1, wherein a section of the wire inlet nozzle between the wire inlet element and the mounting element is formed in a finned or corrugated manner to facilitate a manual rotational movement of the wire inlet nozzle without tools for fixation.

4. A mounting system according to claim 3, wherein in a fixing element of the wire inlet nozzle and in a fixing element of the coupling at least one notch for marking of fixation of the wire core is arranged.

5. A wire inlet nozzle for mounting in a coupling of a hose assembly having a wire inlet element and a mounting element which is formed in a cylindrical manner and has at least one slot for forming at least two movable jaws, wherein the mounting element has an opening to removably receive a wire core and is designed deformable to simultaneously fix the wire core in the mounting element and the wire inlet nozzle in the coupling by a manual rotational movement, wherein the mounting element is provided at an end opposite the wire inlet element with an oval flange, which oval flange is formed in a raised manner with respect to a cylindrical region.

6. A wire inlet nozzle according to claim 5, wherein in the mounting element in a region of the at least one slot, a press region and a spring region are formed to fix the wire core by pressing together the jaws formed next to the at least one slot.

7. A wire inlet nozzle according to claim 5, wherein a region between the wire inlet element and the mounting element is formed in a finned or corrugated manner to facilitate a manual rotational movement without tools for fixation.

8. A wire inlet nozzle according to claim 7, wherein in the region of the element to perform the rotational movement at least one notch for marking of fixation is arranged.

* * * * *